United States Patent [19]

Schoofs

[11] Patent Number: 5,757,625
[45] Date of Patent: May 26, 1998

[54] SWITCHED MODE POWER SUPPLY WITH TRANSFORMER AND FEEDBACK VIA PRIMARY WINDING

[75] Inventor: Franciscus A. C. M. Schoofs, Eindhoven, Netherlands

[73] Assignee: U.S. Philips Corporation, New York, N.Y.

[21] Appl. No.: 722,652

[22] Filed: Sep. 30, 1996

[30] Foreign Application Priority Data

Oct. 2, 1995 [EP] European Pat. Off. .......... 95870111

[51] Int. Cl.⁶ .......... H02M 3/335; H02M 7/537; H02P 13/18
[52] U.S. Cl. .......... 363/21; 363/97; 363/131
[58] Field of Search .......... 363/20, 21, 97, 363/131

[56] References Cited

U.S. PATENT DOCUMENTS

| | | | |
|---|---|---|---|
| 4,425,611 | 1/1984 | Easter | 363/21 |
| 4,682,081 | 7/1987 | Sikora | 363/131 |
| 4,739,462 | 4/1988 | Farnsworth et al. | 363/21 |
| 4,800,323 | 1/1989 | Sikora | 363/19 |
| 5,060,131 | 10/1991 | Sikora | 363/97 |
| 5,138,543 | 8/1992 | Harm et al. | 363/21 |
| 5,448,469 | 9/1995 | Rilly et al. | 363/21 |

OTHER PUBLICATIONS

"Linear Technology", LT1103/LT1105, Offline Switching Regulator, pp. 211–237.

*Primary Examiner*—Peter S. Wong
*Assistant Examiner*—Bao Q. Vu
*Attorney, Agent, or Firm*—Robert M. McDermott

[57] ABSTRACT

A switched-mode power supply which uses the primary winding of the isolation transformer as the feedback mechanism for the regulation of the secondary voltage or current. The primary winding voltage and current are used to control the sampling of the primary winding to obtain a measurement signal which is proportional to the secondary voltage or current, and this measurement signal is used to control the switched drive signal. By using the primary winding as the feedback winding, parts can be saved, and the transformer can be of simpler construction.

17 Claims, 7 Drawing Sheets

SWITCHED MODE POWER SUPPLY WITH TRANSFORMER AND FEEDBACK VIA PRIMARY WINDING

BACKGROUND OF THE INVENTION

1. Field of the Invention

The invention relates to a switched-mode power supply comprising: a first and a second supply terminal for the connection of a primary supply voltage; a transformer having a primary winding with a first winding end coupled to the first supply terminal and a second winding end, and having a feedback winding for the generation of a measurement signal; a controllable switching element, connected between the second winding end and the second supply terminal to produce a periodically interrupted primary current through the primary winding by opening and closing the switching element under control of a drive signal; drive means for generating the drive signal in response to the measurement signal.

Such a power supply can have a high efficiency and small dimensions and is suitable for use in, inter alia, standby power supplies for monitors and TV sets, battery-powered equipment, such as shavers, portable audio and video equipment and in low-cost modular power supplies for, for example, computers.

2. Description of the Related Art

Switched-mode power supplies (SMPS) with a transformer are used particularly if for safety reasons an electrical isolation is required between the load to be powered and the electric mains. Moreover, with a suitable winding ratio it is possible to derive a comparatively low output voltage from the comparatively high mains voltage without the switching element having to be closed for an inadmissibly short time or having to carry inadmissibly large currents. In such power supplies it is necessary to transfer information about the output voltage at the secondary side of the transformer to the control means for the switching element at the primary side of the transformer. The transfer of the desired power is effected via the transformer, i.e. from the primary side to the secondary side. For the transfer of the information about the output voltage or output current a feedback path from the secondary side to the primary side is needed, which should meet the same safety requirements as regards the electrical isolation between the primary and secondary windings. These requirements have been laid down in regulations and standards.

A first generally known solution for such a feedback path is the optocoupler. This optocoupler has the disadvantage that it requires at the secondary side a special circuit for converting the output voltage into a suitable current for the photodiode of the optocoupler and at the primary side a special circuit for adapting the output voltage of the optocoupler to the drive means of the switching element.

Another known feedback method utilizes a special feedback winding which provides information about the output voltage at the secondary side and which can also be used for powering the electronic control circuitry at the primary side. During the time that the switching element is open power is transferred from the primary winding to the secondary winding and the voltage across the additional feedback winding then appears to be a measure of the output voltage at the secondary side. This technique is used inter alia in an Off-Line Switching Regulator LT 1103/1105, which is commercially available from Linear Technology.

However, the feedback winding makes the design of the transformer more expensive and more intricate. This is because the feedback winding should comply with two conflicting requirements, viz.: a satisfactory magnetic coupling to the secondary winding and a satisfactory isolation from the secondary winding. These requirements are even more difficult to meet in the case of smaller dimensions of the transformer.

SUMMARY OF THE INVENTION

It is an object of the invention to provide a switched-mode power supply using a simpler feedback method. To this end, according to the invention, the switched-mode power supply of the type defined in the opening paragraph is characterized in that the feedback winding is the primary winding. Thus, the primary winding itself is used as the feedback winding. The advantages of measuring the output voltage at the primary winding of the transformer are: a simpler and cheaper transformer, lower cost price, and less components if all the electronic elements at the primary side are integrated in one circuit.

The measurement signal across the primary winding is only representative of the output voltage if the secondary winding supplies current. In view of this, an embodiment of the switched-mode power supply in accordance with the invention is characterized in that the switched-mode power supply comprises time window means for generating a time window signal for time-selectively transferring the measurement signal in the open state of the switching element. Thus, the measurement signal on the primary winding is only used during a given period of time. For the further processing of the measurement signal an embodiment of the switched-mode power supply is characterized further in that the switched-mode power supply further comprises: an integrator for generating an integrated measurement signal and a controllable switch for transferring the measurement signal to the integrator under control of the time window signal. In this way, the control signal for the drive means can be generated by means of only one integrator and one switch. This simplifies the design and reduces the number of poles in the transfer function of the control circuit of the switched-mode power supply. A special embodiment of the switched-mode power supply operates in accordance with the current control mode, i.e. the peak current through the switching element is measured and controlled, which results in a very high immunity to variations in the primary supply voltage. According to the invention, this special embodiment is characterized further in that the switched-mode power supply further comprises: means for generating a first signal which is a measure of a current flowing through the switching element; means for comparing a second signal which is a measure of the integrated measurement signal with the first signal; means for generating the drive signal in response to the comparison of the first signal with the second signal.

As a result of this control, the amplitude of the first measurement signal is substantially equal to the peak value of the second measurement signal and, consequently, there is a fixed relationship between the integrated measurement signal and the peak current through the switching element. This enables the integrated measurement signal to be compensated for fluctuating loads. An increasing load produces an increasing voltage drop in the secondary circuit of the power supply circuit. This voltage drop is proportional to the secondary peak current which, in its turn, is proportional to the primary peak current. In accordance with the invention a load compensation is obtained in that the switched-mode power supply further comprises: means for converting the integrated measurement signal into a compensation signal; and means for adding the compensation signal to the measurement signal. The integrated measurement signal is a measure of the peak current. Compensation is now achieved by deriving a compensation signal from the integrated measurement signal and combining it with the measurement signal which has not yet been integrated, and subsequently by means of the controllable switch allowing the combined signal to pass through in the time window only. The compensation signal passes through the same time window as the measurement signal and is thus attenuated by the same factor. It is to be noted that this compensation can also be employed in switched-mode power supplies with an additional measurement winding.

When the switched-mode power supply operates in the discontinuous conduction mode, i.e. the secondary current decreases to zero before the switching element is closed again, another error may arise in the integrated measurement signal if the time window ends at a sign reversal of the voltage across the primary winding upon opening of the switching element. The error then appears to be proportional to the switching frequency. In accordance with the invention, a correction for this is achieved in that the switched-mode power supply further comprises: an element coupled to the integrator to reduce the integrated signal by means of a correction signal. A fixed value of the correction signal is adequate if the switching frequency of the switched-mode power supply is fixed or varies within narrow limits. Particularly for switched-mode power supplies with variable switching frequencies a more sophisticated correction is achieved by means of an embodiment which is characterized in that the correction signal is proportional to the frequency of opening and closing of the switching element. For an element which is suitable for this purpose, reference is made to European Patent Application No. EP-A-0.574.982, which reveals a clocked charge pump, which supplies a pulsating current in the rhythm of a clock signal and which supplies a well-defined amount of charge in each period of the clock signal.

An embodiment of the switched-mode power supply in which the time window automatically adapts itself to varying conditions, is characterized in that the time window means comprise: first means for detecting a zero crossing in the primary current after opening of the switching element; second means for detecting a zero crossing in a primary voltage prevailing across the primary winding after opening of the switching element; and a logic unit having a set input for receiving a set signal generated by the first means and having a reset input for receiving a reset signal generated by the second means, and having an output for supplying the time window signal. The first means detect the end of the commutation, the second means detect the instant at which the secondary current has decreased to zero in the discontinuous conduction mode, or changes sign in the continuous conduction mode while the secondary current does not decrease to zero. The memory element prevents incorrect time windows. It is to be noted that, if desired, in the continuous conduction mode the end of the time window may coincide with the instant at which the switching element is closed.

As a result of the leakage inductance of the transformer the magnetizing current is not commutated immediately from the primary side to the secondary side. During the commutation time currents are flowing both in the primary and in the secondary circuit. The voltage across the primary winding then rises very rapidly to a large value. This high voltage can be limited by means of circuit referred as a snubber. This snubber is used in an embodiment of the switched-mode power supply in accordance with the invention, which is characterized in that the first means comprise: a snubber circuit which is connected across the primary winding and which is non-conductive in the closed state of the switching element; and an interface circuit for converting a signal current through the snubber circuit into the set signal. The fact that the current through the snubber becomes zero is an indication of the end of the commutation and the start of the time window. However, if desired the start of the time window may be also be shifted to the instant at which the commutation starts, i.e. to the instant at which the switching element is opened.

In switched-mode power supplies without a snubber the primary current takes a path through parasitic capacitances when the switching element opens and decays. In that case the primary current can be measured directly and an embodiment is characterized in that the first means comprise an interface circuit for converting a signal current through the primary winding into the set signal. The fact that the current through the primary winding becomes zero here indicates the start of the time window.

Said embodiment with snubber current measurement may be characterized further in that the interface circuit comprises: a first resistor, arranged in series with the snubber circuit to couple the snubber circuit to the first supply terminal; a first transistor having a first main electrode coupled to the first resistor and to the snubber circuit, a second main electrode for supplying a current in response to the signal voltage across the first resistor, and a control electrode coupled to a first bias voltage source.

This embodiment is not only very simple but its is also suitable for use in an integrated circuit with high-voltage bipolar or unipolar (MOS) transistors. The first supply terminal can then be connected directly to a high rectified mains voltage.

In power supplies without a snubber circuit no snubber current can be measured. The embodiment may then be characterized further in that the interface circuit comprises: a first resistor, connected between the first supply terminal and the first winding end; a first transistor having a first main electrode coupled to the first resistor and to the first winding end, a second main electrode for supplying a current in response to the signal voltage across the first resistor, and a control electrode coupled to a first bias voltage source. The first resistor is now disposed in series with the primary winding.

To determine the end of the time window, an embodiment of the invention is characterized in that the second means comprise: a unidirectional element which is connected across the primary winding and which is conductive in the closed state of the switching element; a second resistor, arranged in series with the unidirectional element to couple the unidirectional element to the second winding end; a third transistor having a first main electrode coupled to the second resistor and to the unidirectional element, a second main electrode for supplying a current in response to the signal current through the second resistor, and a control electrode coupled to a second bias voltage source. This embodiment is also very simple and is suited for integration with high-voltage transistors. The second resistor converts the voltage on the second winding end into a current which flows into the third transistor. The unidirectional element functions as a clamp to prevent the voltage on the first main electrode of the second transistor from exceeding the supply voltage. The current through the second resistor is a measure of the voltage across the primary winding and functions, on the one hand, as an indication of the start of the time window and, on the other hand, as the measurement signal.

The control electrode of the first transistor receives a bias voltage from a bias voltage source, which may be characterized in that the first bias voltage source comprises: a second transistor having a first main electrode coupled to the first supply terminal, a second main electrode coupled to a first bias current source, and a control electrode coupled to the second main electrode of the third transistor and to the control electrode of the first transistor. The third transistor can again be a high-voltage transistor.

The first transistor supplies a signal current which is further processed in the interface circuit, which for this purpose may be characterized further in that the interfacecircuit further comprises: a first current mirror having an input branch coupled to the second main electrode of the first transistor via the bias current source, and an output branch coupled to the second main electrode of the first transistor to generate the set signal. The bias current source thus also functions as a reference with which the signal current of the first transistor is to be compared.

The third transistor also supplies a signal current which is further processed in an embodiment, which for this purpose may be characterized further in that the second means further comprise: a second current mirror having an input branch coupled to the second main electrode of the second transistor, and having at least one output branch coupled to a reference current source to generate a reset signal. The signal current of the second transistor is thus compared with the reference current for generation of the reset signal.

The control electrode of the third transistor receives a bias voltage from a bias voltage source, which may be characterized in that the second bias voltage source comprises: a fourth transistor having a first main electrode coupled to the first supply terminal, a second main electrode coupled to a second bias current source and to a further output branch of the second current mirror, and a control electrode coupled to the second main electrode of the fourth transistor and to the control electrode of the second transistor. The second bias current source functions as a starting current source and may supply a current which is relatively small with respect to the current through the third transistor. The further output branch of the second current mirror forces a current through the fourth transistor, which current is substantially equal to that through the third transistor, which ensures a correct match between the settings of the third and the fourth transistor.

During the time window the signal current of the third transistor is a measure of the voltage across the secondary winding. To derive a control signal for the drive means from this signal current, the switched-mode power supply is characterized further in that the second current mirror comprises a further output branch coupled to a further reference current source to supply a difference current; and the switched-mode power supply further comprises: a hold capacitor and a controllable switch for transferring the difference current to the hold capacitor under control of the time window signal. Thus, only one connection point for a hold capacitor is needed and there is only one switch for the generation of the control signal. If the switched-mode power supply operates in the current control mode, the switched-mode power supply in accordance with the invention may be characterized further in that the switched-mode power supply further comprises: means for generating a first signal which is a measure of a current flowing through the switching element; means for comparing a second signal which is a measure of a voltage across the hold capacitor with the first signal; means for generating the drive signal in response to the comparison of the first signal with the second signal. As a result of this control the amplitude of the first measurement signal is substantially equal to the peak value of the second measurement signal and, consequently, there is a fixed relationship between the voltage across the hold capacitor and the peak current through the switching element. This enables the voltage across the hold capacitor to be compensated for fluctuating loads. In accordance with the invention a load compensation is now achieved in that the switched-mode power supply further comprises: means for converting the voltage across the hold capacitor into a compensation current; and means for adding the compensation current to the difference current. The voltage on the hold capacitor is a measure of the peak current. Compensation is now achieved by deriving a compensation signal from this voltage and combining it with the measurement signal which has not yet been integrated and, subsequently, by means of the controllable switch allowing the combined signal to pass through in the time window only. The compensation signal passes through the same time window as the measurement signal and is thus attenuated by the same factor. This compensation method can also be employed in switched-mode power supplies with an additional measurement winding.

When the switched-mode power supply operates in the discontinuous conduction mode another error may arise in the integrated measurement signal if the time window ends at a sign reversal of the voltage across the primary winding after opening of the switching element. The error then appears to be proportional to the switching frequency. In accordance with the invention, a correction for this is achieved in that the switched-mode power supply further comprises: a current-carrying element coupled to the hold capacitor to discharge the hold capacitor with a correction current, and if desired the correction signal may again be proportional to the frequency of opening and closing of the switching element. If the commutation time is included in the window time, this element also allows correction for the static error in the measurement signal as a result of the signal contribution produced in the measurement signal by the commutation.

Another embodiment is characterized in that the switched-mode power supply further comprises: a voltage-controlled oscillator having an output signal which depends on the voltage across the hold capacitor, means for comparing a signal which is a measure of a current flowing through the switching element with a reference value, and a bistable element for generating the drive signal in response to the output signal of the oscillator and an output signal of the means for comparing. In this embodiment the peak current through the switching element is fixed and the frequency of the switched-mode power supply varies. In that case it suffices to apply a fixed correction for the amplitude variation of the measurement signal, which correction can be allowed for in the value of the reference current source.

BRIEF DESCRIPTION OF THE DRAWINGS

These and other aspects of the invention will be described and elucidated with reference to the accompanying drawings, in which.

DESCRIPTION OF THE PREFERRED EMBODIMENTS

In the Figures elements or parts having the same function or purpose bear the same reference symbols.

Figure 1:
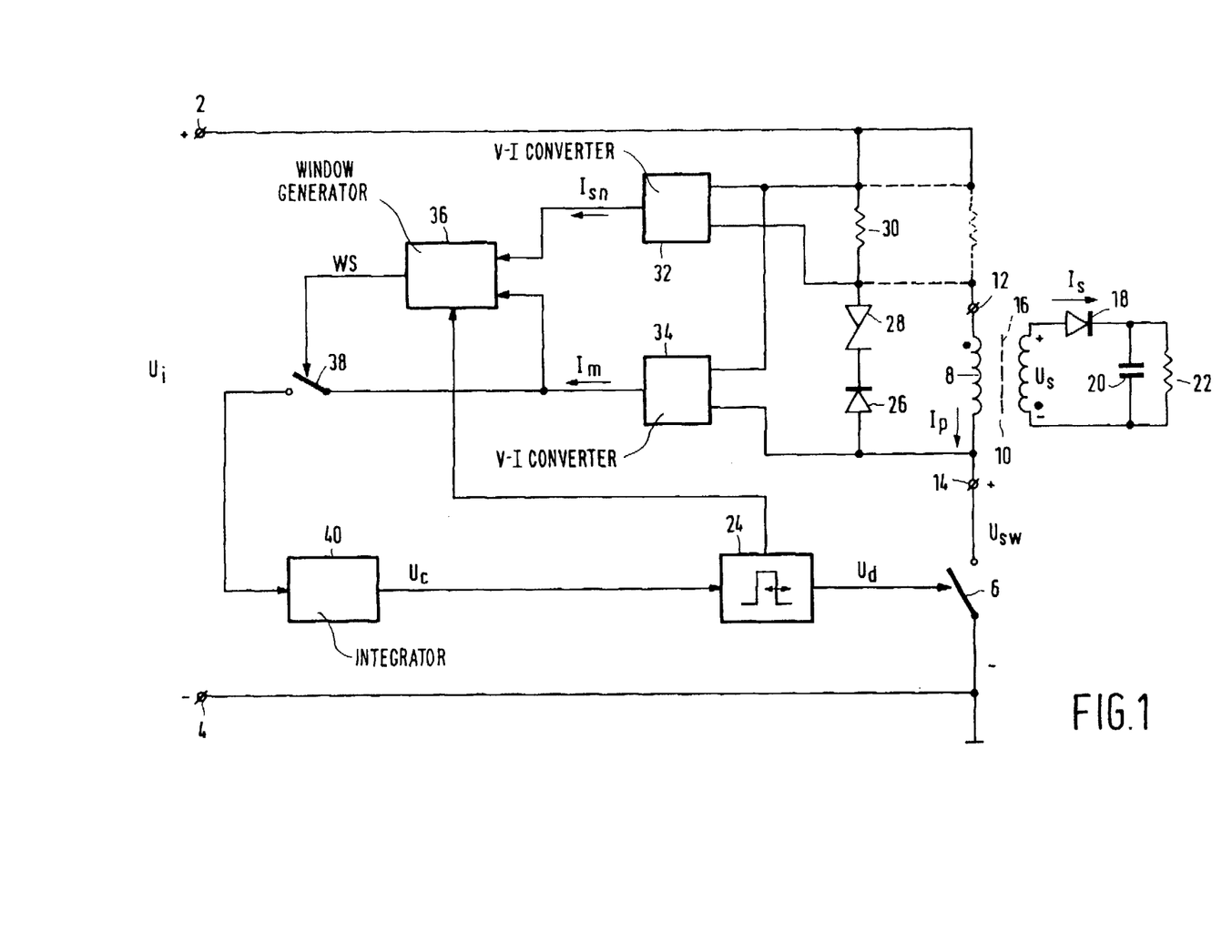
FIG. 1 shows a block diagram of a switched-mode power supply in accordance with the invention.

FIG. 1 shows the block diagram of an embodiment of a switched-mode power supply in accordance with the invention. The power supply receives a primary supply voltage $U_i$ at a first supply terminal 2 and a second supply terminal 4. This primary supply voltage can be a direct voltage or a rectified alternating voltage, for example the mains voltage. It is assumed, by way of example, that the voltage on the first supply terminal 2 is positive relative to the voltage on the second supply terminal 4, which is considered to be grounded. A controllable switching element 6 and the primary winding 8 of a transformer 10 are connected in series between the first supply terminal 2 and the second supply terminal 4, a first winding end 12 being connected to the first supply terminal 2 and a second winding end 14 being connected to the controllable switching element 6. The controllable switching element 6 may comprise, for example, a bipolar transistor or a MOS transistor. The transformer 10 further comprises a secondary winding 16, which by means of a diode 18 is connected to a smoothing capacitor 20 and a load 22, in the present case depicted as a resistor, but any other load such as a motor, a rechargeable battery, or an electrical apparatus to be powered is possible. The dots near the windings of the transformer 10 indicate the winding direction. The controllable switching element 6 is periodically opened and closed by a drive signal $U_d$, which is supplied by drive means 24, which vary the pulse width of the drive signal $U_d$ in dependence on a control signal $U_c$. A snubber circuit comprising a diode 26, a zener diode 28 and a resistor 30 is connected in parallel with the primary winding 8. The voltage across the resistor 30 is measured by means of a first interface circuit 32, which converts the voltage across the resistor 30 into a snubber signal $I_{sn}$. The voltage $U_{sw}$ on the second winding end 14 is measured by means of a second interface circuit 34 and is converted into a measurement signal $I_m$. The snubber signal $I_{sn}$ and the measurement signal $I_m$ are applied to a logic unit 36, which generates a window signal WS from these signals. The measurement signal $I_m$ is also applied to a controllable switch 38, which transfers the measurement signal $I_m$ under control of the window signal WS. The measurement signal $I_m$ thus transferred time-selectively is integrated in an integrator 40, which generates the control signal $U_c$ for the drive means 24.

Figure 2:
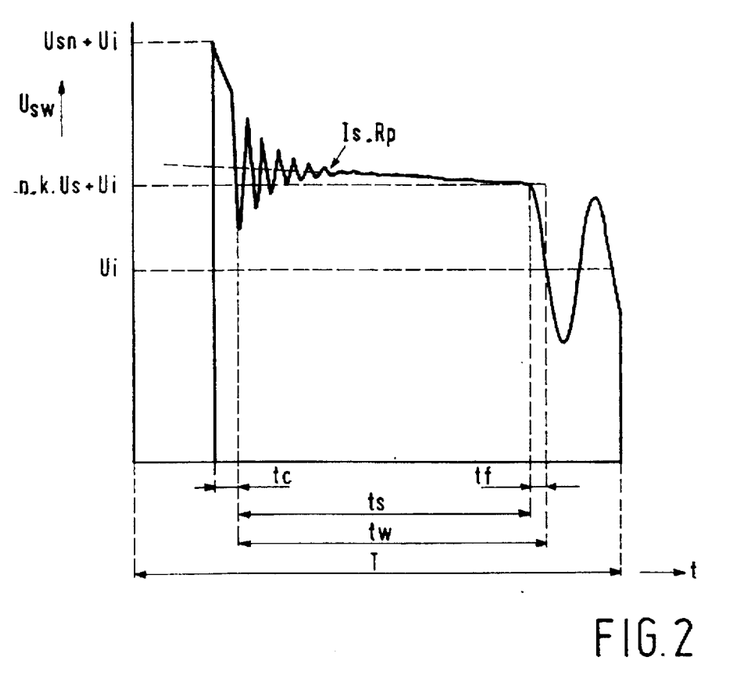
FIG. 2 is a diagram of a signal in a switched-mode power supply in accordance with the invention.

The operation of the switched-mode power supply is known per se. When the controllable switching element 6 is closed the primary current $I_p$ increases linearly, the diode 18 being cut off. After the controllable switching element 6 has opened the accumulated magnetic energy is transferred to the secondary winding 16. As a result of the leakage inductance the magnetizing current is not commutated immediately to the secondary side and during a commutation time $t^c$ currents are flowing both in the primary winding 8 and in the secondary winding 16. The primary current $I_p$ then decreases very rapidly and produces across the primary winding 8 a very large positive voltage peak, which is limited by the zener diode 28 of the snubber circuit. FIG. 2 shows the voltage $U_{sw}$ on the second winding end 14, which is the sum of the supply voltage $U_i$ and the primary winding voltage. As a result of the commutation the winding voltages change signs, so that the diode 18 in the secondary circuit is turned on and the stored energy is transferred to the load 22. The secondary current $I_s$ then decreases until the switching element 6 is turned on again. If the secondary current $I_s$ decreases to zero, the power supply operates in the discontinuous conduction mode (DCM). FIG. 2 relates to this mode. However, the power supply can also be operated in the continuous conduction mode (CCM), in which the switching element 6 is turned on already before the secondary current $I_s$ has decreased to zero. In that case the end point of the time window can coincide with the turn-on instant of the switching element 6. In FIG. 2 $t_s$ is the flyback time, in which after the commutation time $t^c$ the secondary current $I_s$ decreases from a certain maximum value to zero. During this flyback time $t_s$ the voltage across the primary winding 8 is proportional to the voltage across the secondary winding 16. This secondary voltage $U_s$ is the sum of the voltage across the load 22, the voltage across the diode 18 and the voltage across the effective internal resistance of the secondary winding 16. Owing to the decrease of the secondary current $I_s$, the secondary voltage also comprises a decreasing component $I_s*R_p$, $R_p$ being the overall resistance of the diode 18 and the secondary winding 16.

The voltage across the primary winding 8 is representative of the secondary voltage and can be used as measurement voltage from the instant at which the switching element 6 is opened, for example after the commutation time $t_c$, i.e. when the primary current $I_p$ is zero. Therefore, a time window is needed to enable a suitable part of the primary voltage to be selected after the switching element 6 has been opened. The end of the commutation time $t^c$ may be selected as the start of the time window. This instant is determined by measuring the snubber current which flows through the resistor 30. The instant at which the snubber current becomes zero defines the start of the time window $t_w$. At the instant at which the snubber current becomes zero the primary winding voltage will not immediately become equal to the back-transformed secondary voltage. This is caused by the fact that the leakage inductance and the parasitic capacitance form an LC circuit at the primary side, which produces a damped oscillation. This oscillation is superposed on the linearly decreasing measurement signal, as shown in FIG. 2. On the average this oscillation has hardly any or no influence on the magnitude of the integrated measurement signal $U_c$. The time window ends approximately at the instant at which the secondary current $I_s$ becomes zero, at least in the DCM. In that case the primary voltage will decay again but now with a lower frequency, which is determined by the primary inductance instead of the much smaller leakage inductance. The first zero crossing of this decaying primary voltage is used to determine the end point of the time window $t_w$. In the CCM the end point is determined by the turn-on instant of the controllable switching element 6.

Thus, when the controllable switching element 6 is open, it is possible by measuring when the snubber current becomes zero and by measuring a zero crossing in the voltage across the primary winding 8, to define a time window within which the primary voltage can be used as a measurement signal which is representative of the secondary voltage and which can be used as feedback signal. To this end, the measurement signal is time-selectively transferred by means of the controllable switch 38 during the time window and is averaged in the integrator 40. A decreasing voltage across the load 22 results in a smaller measurement signal $I_m$ and in a smaller control voltage $U_c$. The drive means 24 increase the duty cycle of the drive signal $U_d$, as a result of which the switching element 6 remains conductive for a longer time and more energy is built up in the transformer 10. As a consequence, the secondary voltage increases and the initial decrease of the voltage across the load is eliminated.

A snubber is not always necessary or desirable. In that case the diode 26 and the zener diode 28 are dispensed with and the resistor 30 is connected between the first supply terminal 2 and the first winding end 12, as shown in broken lines in FIG. 1. Thus, the current through the primary winding 8 can be measured again by means of the first interface circuit 32. This alternative is shown in a similar manner for the embodiments to be described with reference to FIGS. 3 and 5.

The commutation time $t_c$ may also be included in the time window, which then starts at the instant at which the switching element 6 is turned off. This timing relationship is indicated in FIG. 1 as a connecting line between the drive means 24 and the logic unit 36 and also symbolizes the timing relationship in the CCM, in which the end of the window time coincides with the turn-on of the switching element 6. The inclusion of the commutation time $t_c$ introduces a static measurement error in the measurement signal owing to the signal contribution caused in the measurement signal by the commutation. This error can be corrected in a manner to be described in detail hereinafter.

Figure 3:
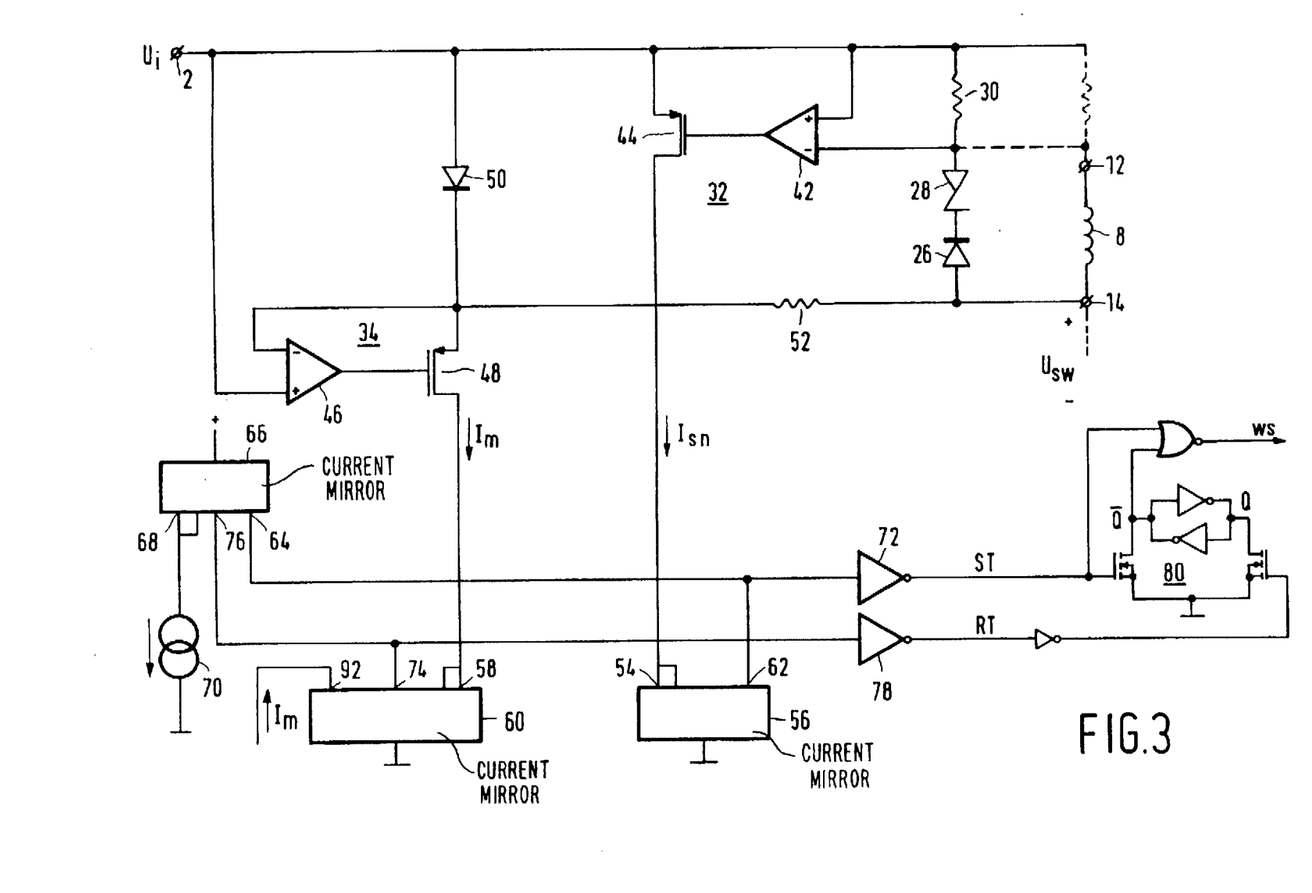
FIG. 3 shows an embodiment of a switched-mode power supply in accordance with the invention.
Figure 4:
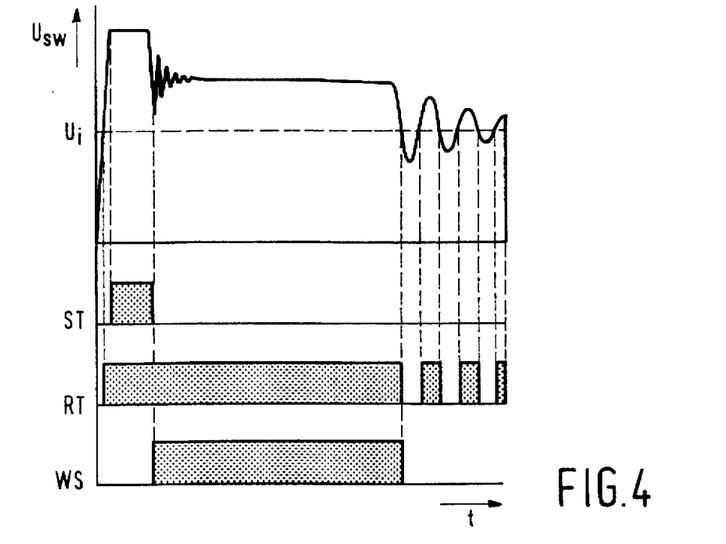
FIG. 4 is a diagram of signals appearing in a switched-mode power supply in accordance with the invention.

FIG. 3 shows more details of the voltage-current converters 30 and 32 and the logic unit of the power supply circuit shown in FIG. 1. The first voltage-current converter 32 comprises a differential amplifier 42 having its non-inverting input connected to the first supply terminal 2 and its inverting input to the resistor 30. The output of the differential amplifier 42 controls the gate of a PMOS transistor 44, whose source is connected to the first supply terminal 2. The drain of the PMOS transistor 44 supplies a current $I_{sn}$ which is a measure of the snubber current through the resistor 30. The second voltage-current converter 34 comprises a differential amplifier 46, a PMOS transistor 48, a diode 50 and a resistor 52. The differential amplifier 46 has its non-inverting input connected to the first supply terminal 2, its inverting input to the source of the PMOS transistor 48, and its output to the gate of the PMOS transistor 48. Moreover, the PMOS transistor 48 has its source connected to the second winding end 14 via the resistor 52 and to the first supply terminal 2 via the diode 50. The diode 50 cuts off when the voltage $U_{sw}$ on the winding end 14 is higher than the input voltage $U_i$, as a result of which a measurement current $I_m$ flows through the PMOS transistor 48. The current $I_m$ flows into an input branch 54 of a first current mirror 56. The current $I_m$ flows into the input branch 58 of a second current mirror 60. An output branch 62 of the first current mirror 56 is connected to an output branch 64 of a third current mirror 66, whose input branch 68 is connected to a reference current source 70. Thus, the difference is measured between the reference current from the reference current source 70 and the current $I_{sn}$. This difference is amplified to form a set signal ST in a buffer 72. Likewise, an output branch 74 is connected to an output branch 76 of the third current mirror 66 to compare the current $I_m$ with a reference current, the current difference being converted into a reset signal RT in a buffer 78. FIG. 4 shows the set signal ST and the reset signal RT together with the voltage $U_{sw}$ on the second winding end 14. During the commutation a current flows through the snubber resistor 30 and the set signal ST is high. The reset signal is high when the voltage $U_{sw}$ is higher than the voltage $U_i$. The decay of the voltage $U_{sw}$ causes undesired reset signals, which can be prevented by means of a memory element.

The logic unit 36 can be implemented in various manners. The falling edge in the set signal ST and the falling edge in the reset signal RT can be used to set and reset a memory element which supplies the time window signal WS. The time window can also be generated by means of a memory element 80, which does not use the edges but which the uses the set signal ST for setting and the inverted reset signal RT for resetting. If the switched-mode power supply operates in the continuous conduction mode the end of the time window is determined by the turn-on instant of the switching element 6. In that case the drive means 24 supply a suitable signal $I_d$ to the logic unit 36, from which signal the reset signal is derived.

Figure 5:
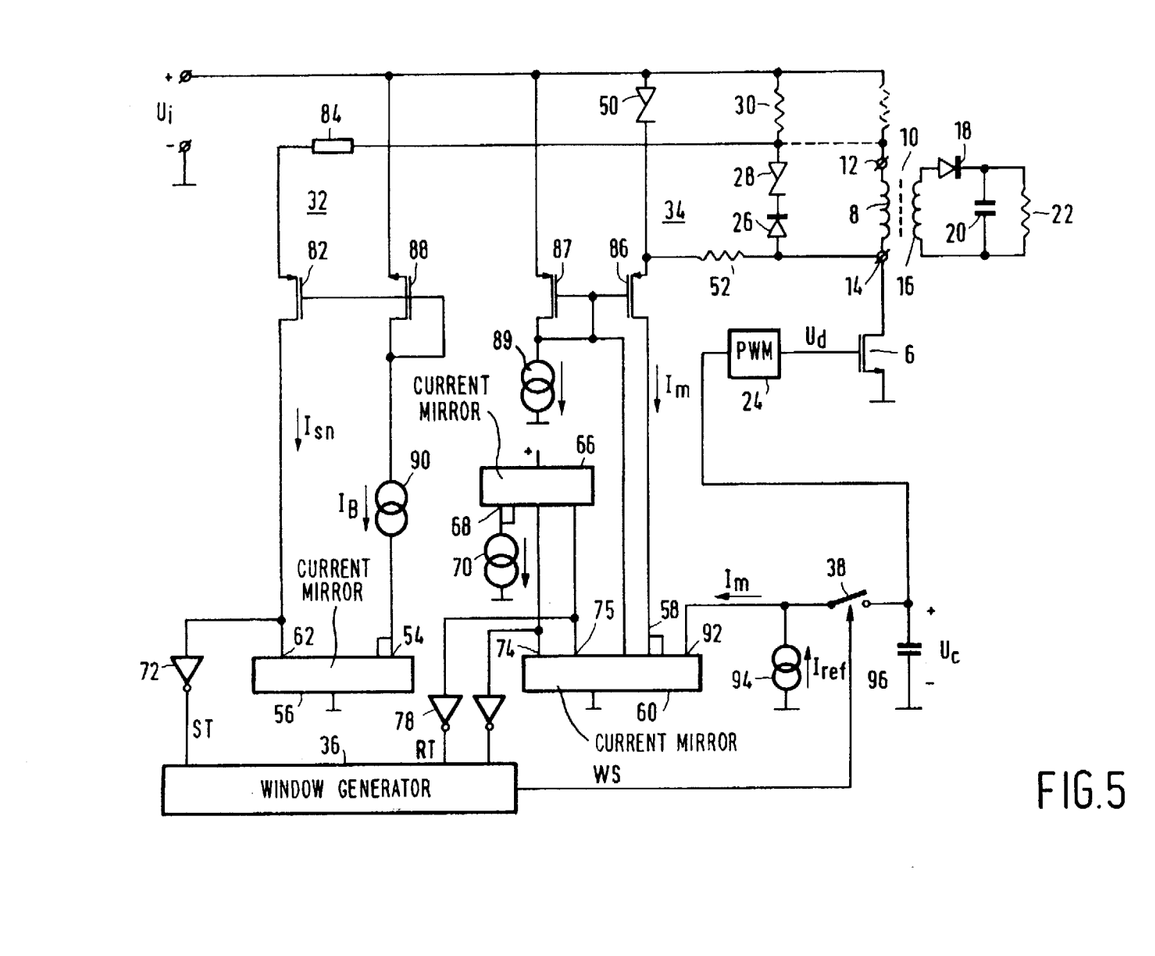
FIG. 5 shows an embodiment of a switched-mode power supply in accordance with the invention.

FIG. 5 shows in more detail another embodiment of the switched-mode power supply of FIG. 1. The first voltage-current converter 32 now comprises a PMOS transistor 82 having its source connected to the node between the zener diode 28 and the resistor 30 via a resistor 84. The second voltage-current converter 34 comprises a PMOS transistor 86 whose source, in the same way as in FIG. 3, is connected to the diode 50, in the present case a zener diode, and the resistor 52. The PMOS transistor 82 has its gate interconnected to the gate of a diode-connected PMOS transistor 88, which has its gate and drain interconnected and which has its source connected to the first supply terminal 2. A bias current $I_B$ flowing through the PMOS transistor 88 is supplied by a bias current source 90, which is connected between the drain of the PMOS transistor 88 and the input branch 54 of the first current mirror 56. The PMOS transistor 86 has its gate interconnected to the gate of a diode-connected PMOS transistor 87, which has its gate and drain interconnected and which has its source connected to the first supply terminal 2. A small starting current flows through the PMOS transistor 87 and is supplied by a current source 89, which is connected between the drain of the PMS transistor 87 and ground. Furthermore, a current equal to the current through the PMOS transistor 86 flows through the PMOS transistor 87 because an output branch 75 of the second current mirror 60 is coupled to the drain of the PMOS transistor 87. As a result, substantially equal currents flow through the PMOS transistors 86 and 87 and the gate-source voltages of these transistors are highly equal to one another. The simplicity of the circuits makes this embodiment is very suitable for integration. When PMOS high-voltage transistors are used it is thus possible to provide an isolation between the high supply voltage $U_i$ and the electronic signal circuitry.

If desired, the measurement signal $I_m$ can be compared with a plurality of references in order to generate further timing signals so as to create a suitable time window in the flyback time. For this purpose, the second current mirror 60 comprises further output branches coupled to respective output branches of the third current mirror 66 and to respective buffers. The various references are obtained, for example, by giving the respective output branches of the third current mirror 66 another current gain than the input branch 68.

The second current mirror 60 further has an output branch 92 coupled to a reference current source 94. The difference between the mirrored current $I_m$ and the reference current $I_{ref}$ from the reference current source 94 flows to a hold capacitor 96 via the controllable switch 38, which capacitor integrates the difference current during the time window under control of the time window signal WS of the logic unit 36. The control voltage $U_c$ across the hold capacitor 96 determines the duty cycle of the drive signal $U_d$ with which the drive means 24 drive the controllable switching element 6, in the present case an NMOS transistor. The output voltage across the load 22 can be adjusted by means of the reference current $I_{ref}$ of the reference current source 94.

Figure 6:
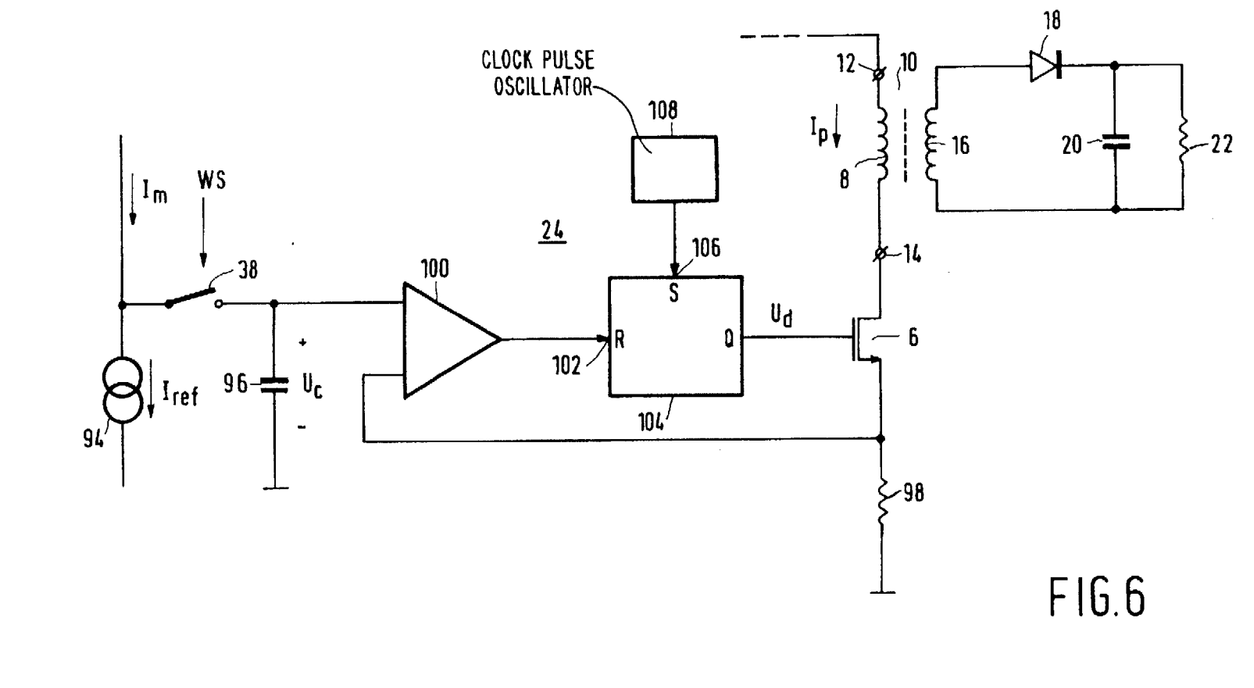
FIG. 6 shows a variant of a switched-mode power supply in accordance with the invention.

A frequently used variant of the switched-mode power supply operates in accordance with current mode control, in which the peak current through the controllable switching element 6 is monitored. FIG. 6 shows a detail of an embodiment operating in accordance current mode control. In series with the controllable switching element 6 a resistor 98 has been included, through which the primary current $I_p$ flows when the controllable switching element 6 is closed. The voltage across the resistor 98 is compared with the control voltage $U_c$ across the hold capacitor 96 by means of a comparator 100, which drives the reset input 102 of a flip-flop 104, whose set input 106 receives a recurrent pulse from a clock pulse oscillator 108. The flip-flop 104 supplies the control signal $U_d$ to the controllable switching element 6. In this way, the peak value of the primary current $I_p$ will be in a fixed relationship with the control voltage $U_c$ and will not be influenced by variations in the input voltage $U_i$. Moreover, the current through the controllable switching element 6 is thus limited to a safe value.

Figure 7:
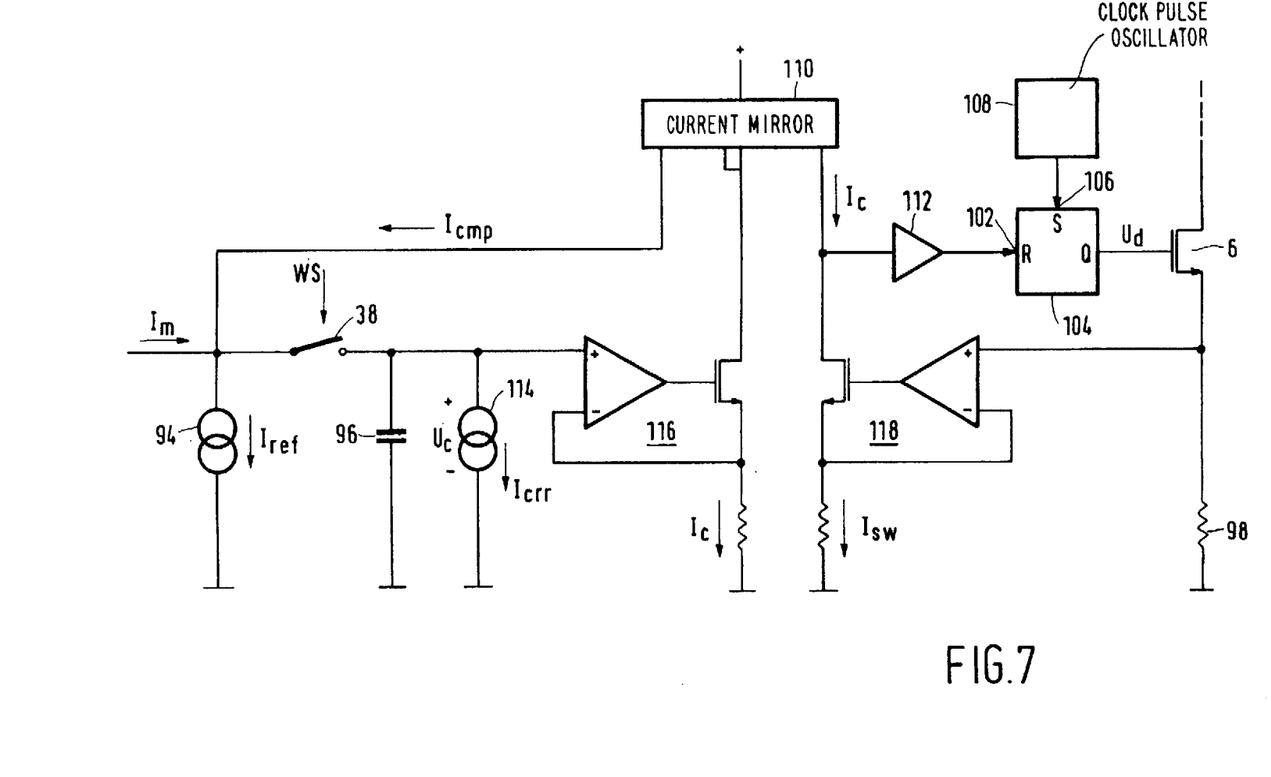
FIG. 7 shows an alternative variant of a switched-mode power supply in accordance with the invention.

FIG. 7 shows a circuit similar to that in FIG. 6, in which the voltage across the resistor 98 and the control voltage $U_c$ across the hold capacitor 96 have been converted to the currents $I_{sw}$ and $I_c$, respectively, by means of voltage-current converters 118 and 116 of a type corresponding to the second voltage-current converter 34 of FIG. 3. The control current $I_c$ is mirrored by a current mirror 110 and compared with the current $I_{sw}$, the current difference driving the reset input 102 of the flip-flop 104 via a buffer 112. The current mode control configuration further offers a possibility of correcting for the decreasing component $I_s*R_p$ in the measurement signal $I_m$ shown in FIG. 2, because the peak value of the primary current $I_p$ is proportional to the peak value of the current. For this purpose, the control current $I_c$ is fed back as a compensation current $I_{cmp}$, via the current mirror 110 with a separate output branch, to the point receiving the reference current $I_{ref}$ from the reference current source 94 and the measurement current $I_m$. The magnitude of the compensation current $I_{cmp}$ is proportional to the area of the triangular component of the measurement signal and consequently varies along with possible load variations. A higher load gives rise to a larger secondary peak current and, consequently, to a larger primary peak current. Owing to the fixed relationship between the control voltage $U_c$ and the peak value of the primary current, the control voltage $U_c$ or the control current $I_c$ is a measure of the secondary peak current and hence of the area of the triangular component in the measurement signal. The compensation current $I_{cmp}$ should pass through to the same time window as the measurement signal.

In FIG. 2 there is a time difference $t_f$ between the instant at which the secondary current becomes zero and the instant at which the primary voltage passes through zero for the first time. As a result, the time window is slightly too long. This can be corrected by withdrawing a current $I_{err}$ from the hold capacitor 96, for example by means of a current source 114. During the time difference $t_f$ the measurement current $l_m$ is not yet zero owing to the decay caused by the primary inductance in combination with the parasitic capacitances and an error current flows into the hold capacitor 96. The time $t_f$ is constant for a given output voltage, so that the hold capacitor 96 receives a charge surplus per switching period T. This can be corrected by means of the current source 114. A similar static error occurs if the commutation time $t_c$ is comprised in the window time. This can also be corrected by means of the current source 114. If the switching frequency of the power supply varies, it is preferred to make the current $I_{err}$ of the current source 114 also frequency dependent. For a current source which is suitable for this purpose, reference is made to the afore-mentioned European Patent Application EP-A-0 574 982, which discloses a clocked charge pump which supplies a pulsating current in the rhythm of a clock signal and which supplies a well-defined amount of charge in each period of the clock signal. This known charge pump can then be clocked, for example, by a signal derived from the drive signal $U_d$.

Figure 8:
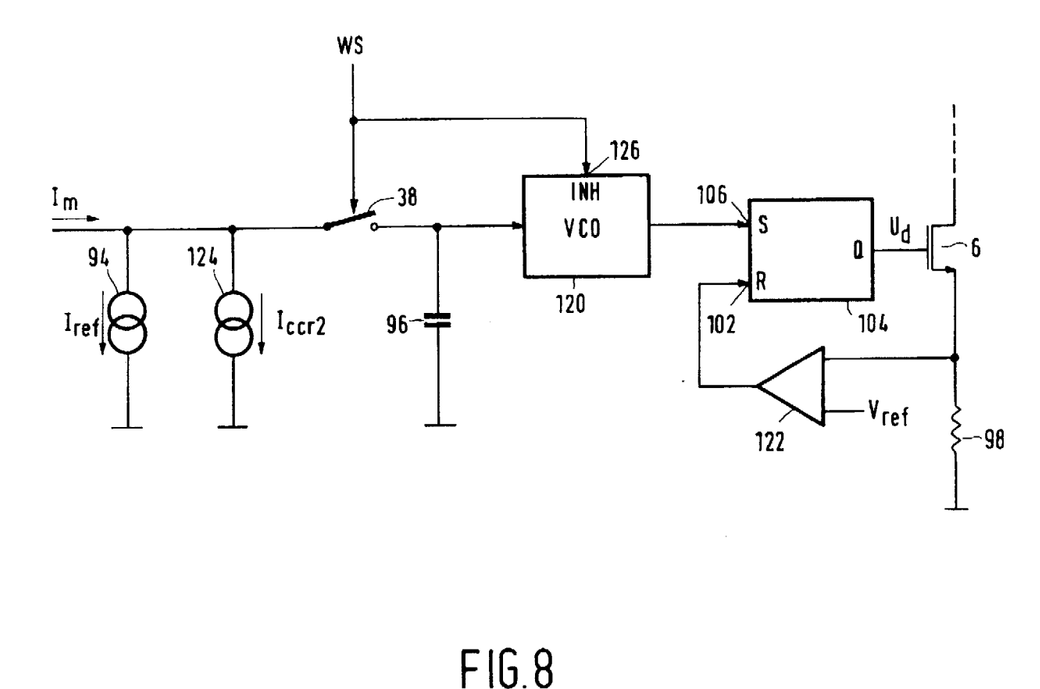
FIG. 8 shows a further alternative variant of a switched-mode power supply in accordance with the invention.

FIG. 8 shows an alternative embodiment with a voltage-dependent sawtooth oscillator 120, which triggers the set input 106 of the flip-flop 104 driving the switching element 6. The current through the switching element 6 is again sensed by means of the resistor 98. A comparator 122 compares the voltage across the resistor 98 with a reference voltage $V_{ref}$. The comparator 122 drives the reset input 102 of the flip-flop 104. This ensures that the peak current through the primary winding is fixed. The area of the triangular component of the measurement signal is then also fixed and it suffices to apply a fixed correction of the reference current $I_{ref}$, represented by a current source 124 and $I_{corr2}$. The oscillator 120 further has an inhibit input 126, to which the time window signal WS is applied. The oscillator 120 generates a set signal at the end of the time window signal WS or so much later as dictated by the voltage on the hold capacitor (off-time modulation).

Obviously, the described compensation for the triangular component in the measurement signal and the correction for the time difference $t_f$ and/or $t_c$ can also be used in switched-mode power supplies in which the primary winding of the transformer is not used as a feedback winding but in which the transformer has a separate secondary winding for this purpose, or in which an optocoupler is used.

The embodiments described above mainly utilize signal currents, current comparators and current mirrors. Obviously, it is also possible to use signal voltages, reference voltages and voltage comparators etc. The transistors shown can be of any desired type, for example bipolar transistors or MOS transistors. The first main electrode, the second main electrode and the control electrode correspond to the emitter, the collector and the base, respectively, for a bipolar transistor and to the source, the drain and the gate, respectively, for a MOS transistor.

The drive means shown in FIG. 1 are based on pulse-width modulation (PWM) of the drive signal $U_d$ of the switching element 6. However, this is not essential for the invention. The control signal $U_c$ could, for example, also vary the frequency of the drive signal $U_d$ in order to stabilize the output voltage across the load.

I claim:

1. A switched-mode power supply comprising:
   a first and a second supply terminal for the connection of a primary supply voltage:
   a transformer having
   a primary winding with a first and second winding end, said first winding end coupled to the first supply terminal, and said primary winding comprising a feedback winding for the generation of a measurement signal;

a controllable switching element, connected between the second winding end and the second supply terminal to produce a periodically interrupted primary current through the primary winding by opening and closing the switching element under control of a drive signal;

drive means for generating the drive signal in response to the measurement signal, characterized in that the switched-mode power supply comprises time window means for generating a time window signal for time-selectively transferring the measurement signal in the open state of the switching element, the time window means comprising:
  first means for detecting a zero crossing in the primary current after opening of the switching element;
  second means for detecting a zero crossing in a primary voltage prevailing across the primary winding after opening of the switching element; and
  a logic unit having:
    a set input for receiving a set signal generated by the first means and
    a reset input for receiving a reset signal generated by the second means, and
    an output for supplying the time window signal.

2. A switched-mode power supply as claimed in claim 1, characterized in that the first means comprise: a snubber circuit which is connected across the primary winding and which is non-conductive in the closed state of the switching element; and an interface circuit for converting a signal current through the snubber circuit into the set signal.

3. A switched-mode power supply as claimed in claim 2, characterized in that the interface circuit comprises: a first resistor, arranged in series with the snubber circuit to couple the snubber circuit to the first supply terminal; a first transistor having a first main electrode coupled to the first resistor and to the snubber circuit, a second main electrode for supplying a current in response to the signal voltage across the first resistor, and a control electrode coupled to a first bias voltage source.

4. A switched-mode power supply as claimed in claim 3, characterized in that the first bias voltage source comprises: a second transistor having a first main electrode coupled to the first supply terminal, a second main electrode coupled to a first bias current source, and a control electrode coupled to the second main electrode of the second transistor and to the control electrode of the first transistor.

5. A switched-mode power supply as claimed in claim 4, characterized in that the interface circuit further comprises: a first current mirror having an input branch coupled to the second main electrode of the first transistor via the bias current source, and an output branch coupled to the second main electrode of the first transistor to generate the set signal.

6. A switched-mode power supply as claimed in claim 1, characterized in that the first means comprise an interface circuit for converting a signal current through the primary winding into the set signal.

7. A switched-mode power supply as claimed in claim 6, characterized in that the interface circuit comprises: a first resistor, connected between the first supply terminal and the first winding end; a first transistor having a first main electrode coupled to the first resistor and to the first winding end, a second main electrode for supplying a current in response to the signal voltage across the first resistor, and a control electrode coupled to a first bias voltage source.

8. A switched-mode power supply as claimed in claim 7, characterized in that the first bias voltage source comprises: a second transistor having a first main electrode coupled to the first supply terminal, a second main electrode coupled to a first bias current source, and a control electrode coupled to the second main electrode of the second transistor and to the control electrode of the first transistor.

9. A switched-mode power supply as claimed in claim 8, characterized in that the interface circuit further comprises: a first current mirror having an input branch coupled to the second main electrode of the first transistor via the bias current source, and an output branch coupled to the second main electrode of the first transistor to generate the set signal.

10. A switched-mode power supply as claimed in claim 1, characterized in that the second means comprise: a unidirectional element which is connected across the primary winding and which is conductive in the closed state of the switching element; a second resistor, arranged in series with the unidirectional element to couple the unidirectional element to the second winding end; a third transistor having a first main electrode coupled to the second resistor and to the unidirectional element, a second main electrode for supplying a current in response to the signal current through the second resistor, and a control electrode coupled to a second bias voltage source.

11. A switched-mode power supply as claimed in claim 10, characterized in that the second means further comprise: a second current mirror having an input branch coupled to the second main electrode of the second transistor, and having at least one output branch coupled to a reference current source to generate a reset signal.

12. A switched-mode power supply as claimed in claim 11, characterized in that the second bias voltage source comprises: a fourth transistor having a first main electrode coupled to the first supply terminal, a second main electrode coupled to a second bias current source and to a further output branch of the second current mirror, and a control electrode coupled to the second main electrode of the fourth transistor and to the control electrode of the second transistor.

13. A switched-mode power supply as claimed in claim 11, characterized in that the second current mirror comprises a further output branch coupled to a further reference current source to supply a difference current; and the switched-mode power supply further comprises: a hold capacitor and a controllable switch for transferring the difference current to the hold capacitor under control of the time window signal.

14. A switched-mode power supply as claimed in claim 13, characterized in that the switched-mode power supply further comprises: means for generating a first signal which is a measure of a current flowing through the switching element; means for comparing a second signal which is a measure of a voltage across the hold capacitor with the first signal; means for generating the drive signal in response to the comparison of the first signal with the second signal.

15. A switched-mode power supply as claimed in claim 14, characterized in that the switched-mode power supply further comprises: means for converting the voltage across the hold capacitor into a compensation current; and means for adding the compensation current to the difference current.

16. A switched-mode power supply as claimed in claim 13, characterized in that the switched-mode power supply further comprises: a current-carrying element coupled to the hold capacitor to discharge the hold capacitor with a correction current.

17. A switched-mode power supply as claimed in claim 16, characterized in that the correction current is proportional to the frequency of opening and closing of the switching element.

* * * * *